June 24, 1930.  C. H. PHELPS  1,766,306
TOOL FOR MEASURING THE CASTER OF AXLES
Filed Aug. 12, 1929
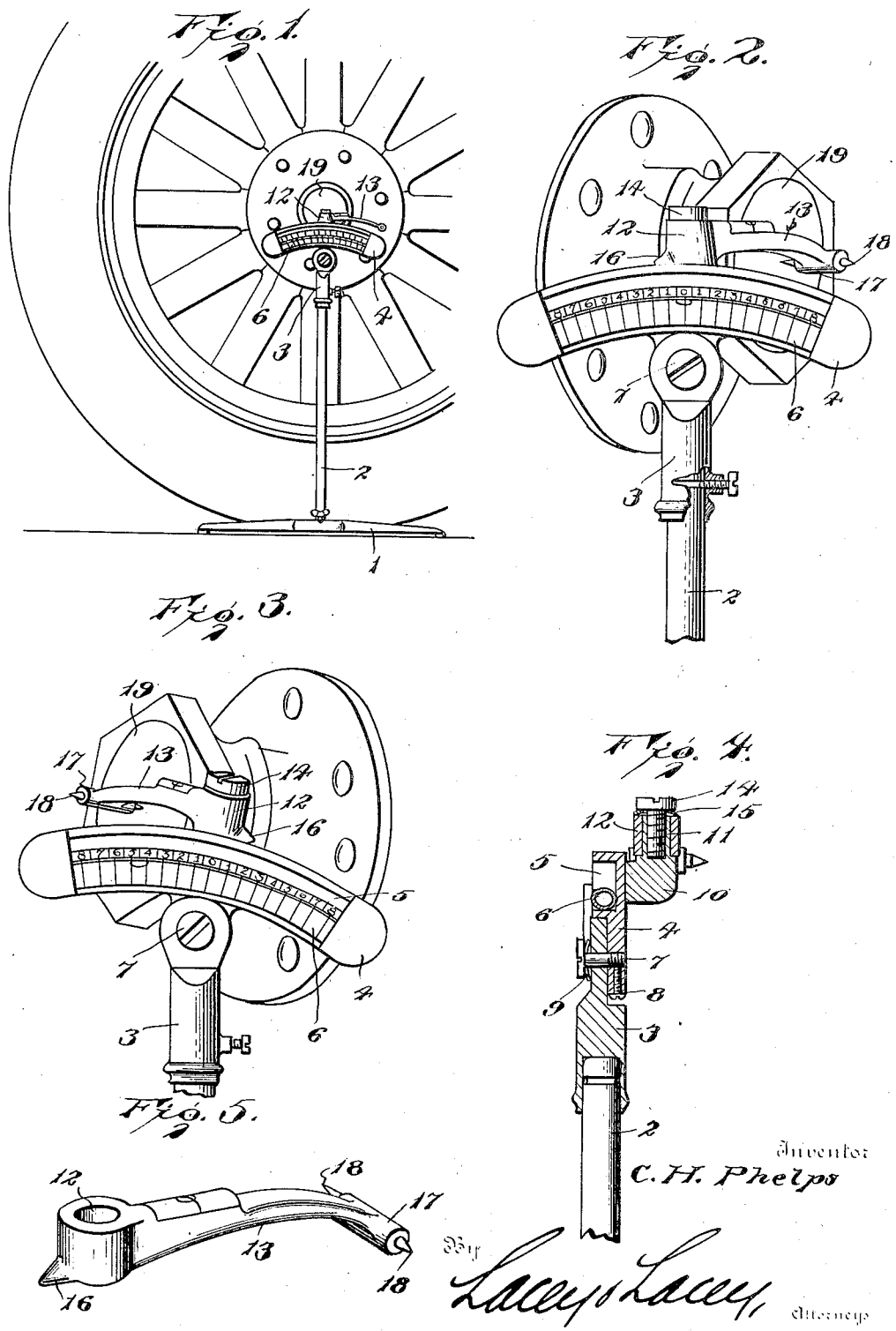

Patented June 24, 1930

1,766,306

UNITED STATES PATENT OFFICE

CLYDE H. PHELPS, OF MOUNT VERNON, NEW YORK, ASSIGNOR TO ACCUROMETER MFG. CO., INC., OF NEW YORK, N. Y., A CORPORATION OF NEW YORK

TOOL FOR MEASURING THE CASTER OF AXLES

Application filed August 12, 1929. Serial No. 385,352.

This invention is a device for measuring the caster of the axle of an automobile, the object being to provide a very simple and easily manipulated tool which will be accurate in its results. The invention is illustrated in the accompanying drawing and will be hereinafter fully set forth and defined.

In the drawing:

Figure 1 is a side elevation of a wheel showing the tool in position adjacent the same, Fig. 2 is an enlarged view showing the hub cap in one position with one side of the meter arm engaged therewith, Fig. 3 is a similar view showing the hub cap shifted to the opposite side of the device and the meter bar or arm swung to engage the hub cap in its shifted position, Fig. 4 is a detail vertical section of the tool, and Fig. 5 is a detail perspective view of the meter arm.

In carrying out the invention, there is provided a base 1 of substantial form whereby it will tend to remain permanently in the position in which it may be set and rising from said base is a post 2 which is preferably detachably held in the base so that it may be easily removed when the tool is to be stored or transported. Swiveled upon the upper end of the post 2 is a socket member 3 to which is pivotally attached a head or indicator 4 which is preferably an arcuate bar having a recess 5 in its outer face and having a spirit level 6 secured in said recess. This head or bar is pivoted midway its ends to the upper end of the socket member 3 by a bolt 7 which may rotate in the socket member but has threaded engagement with the head, a set screw 8 being provided to lock the pivot bolt against withdrawal in an obvious manner. A spring washer 9 is fitted under the head of the pivot bolt so that the head or bar 4 will be frictionally held to the socket member and, therefore, remain in a set position. On the rear side of the head or bar 4 is a block or body 10 having a hollow post 11 on its upper side at its center and rotatably engaged around said post is the hub 12 formed at one end of the meter bar 13. A pivot bolt 14 is threaded into the post 11 and a spring washer 15 is fitted under the head of this bolt so that the hub 12 will be held on the post and the meter arm will be held frictionally in a set position. At the base of the hub 12 is a lug 16 which is adapted to bear against the rear side of the head 4 and thereby limit the swinging movement of the meter arm while at the free end of the arm is a transverse head 17 having a spur or pointed tooth 18 at each end, said spurs or teeth being disposed axially of the head, as will be understood.

The operation of the device will, it is thought, be readily understood. The operator having determined that the front and rear axles of the vehicle are in the same horizontal plane, places the tool alongside the front wheel, as shown in Fig. 1, so that the pivot or hub 12 of the meter arm will be disposed in alinement with the center of the hub cap 19, the spirit level 6 at this time having its bubble at the center or zero point. The wheel is then turned as in the act of steering so that the center of the hub cap will be moved to a position forward of the hub 12 and the meter arm is then swung so that one point 18 bears against the hub cap at the exact center of the same. The wheel is then swung rearwardly to the position shown in Fig. 3, in which position the hub cap will be at the same distance rearwardly of the center of the level 6 as it was in advance of said center in Fig. 2. The meter arm is then swung through half a circle so that the previously free point 18 will be caused to engage the hub cap at the exact center of the same and this movement will cause the head 4 to shift pivotally inasmuch as the hub will move upwardly or downwardly in swinging from the position shown in Fig. 2 to that shown in Fig. 3, owing to the fact that the king pin and axle are set at a caster or tilt longitudinally of the vehicle. The bubble of the spirit level will, of course, move to the high point of the level and thereby mark the variation from the position shown in Fig. 2 and this variation will indicate the tilt or caster of the axle. By comparing the noted measurement with the specifications for the vehicle, the extent of repairs needed will be known. It may be noted that, in order to facilitate the reading, each two degrees on the spirit level mark one degree of caster in the axle and king pin.

Having thus described the invention, I claim:

1. A tool for the purpose set forth comprising a head, means for pivotally supporting the head whereby it may tilt to either side, and a meter arm pivotally mounted at one end upon the head at the center thereof and having its free end adapted to engage a hub cap shifted from a position at one side of the pivot of the head to a position at the opposite side of the center of the head and equi-distant therefrom.

2. A tool for the purpose set forth comprising a tiltable head, a level on the head, and a meter arm pivoted at one end upon the center of the head to swing across the top of the head and provided at its free end on its oposite sides with points to engage a hub cap.

3. A tool for the purpose set forth comprising a head, means for pivotally supporting the head, a level on the head, and a meter arm pivoted at one end upon the head at the center thereof to swing in a plane passing over the head, said meter arm being provided at its free end with center points at its opposite sides and provided at its pivoted end with a stop adapted to impinge against the head.

In testimony whereof I affix my signature.

CLYDE H. PHELPS. [L. S.]